(12) United States Patent
Raimbault et al.

(10) Patent No.: US 6,177,858 B1
(45) Date of Patent: Jan. 23, 2001

(54) METHOD FOR REMOTELY INTERROGATING TAGS, AND STATION AND TAG IMPLEMENTING SAID METHOD

(75) Inventors: Pierre Raimbault, 9 Rue Portalis, 75008 Paris; Jean Goupil, Paris, both of (FR)

(73) Assignee: Pierre Raimbault, Paris (FR)

( * ) Notice: Under 35 U.S.C. 154(b), the term of this patent shall be extended for 0 days.

(21) Appl. No.: 08/757,933

(22) Filed: Nov. 27, 1996

(30) Foreign Application Priority Data

Dec. 1, 1995 (FR) ................................................ 95 14251

(51) Int. Cl.[7] ........................................................ H04Q 9/00
(52) U.S. Cl. ................. 340/10.1; 340/10.51; 340/10.52; 340/825.56; 340/825.08; 235/494
(58) Field of Search ................ 340/10.1, 10.51, 340/10.52, 825.52, 825.22, 825.08; 235/494

(56) References Cited

U.S. PATENT DOCUMENTS

| | | | | |
|---|---|---|---|---|
| 3,952,285 | * | 4/1976 | Falk, Jr. ............................... | 340/10.1 |
| 4,071,908 | | 1/1978 | Brophy et al. ....................... | 364/900 |
| 4,510,495 | * | 4/1985 | Sigrimis et al. ..................... | 340/10.1 |
| 4,525,713 | * | 6/1985 | Barletta et al. ...................... | 340/10.1 |
| 4,663,625 | * | 5/1987 | Yewen .................................. | 340/10.1 |
| 4,667,193 | * | 5/1987 | Cotie et al. ...................... | 340/825.08 |
| 4,862,160 | * | 8/1989 | Ekchian et al. ...................... | 340/10.1 |
| 5,426,423 | | 6/1995 | Raimbault et al. .................. | 340/825 |
| 5,528,221 | | 6/1996 | Jeuch et al. .......................... | 340/572 |

FOREIGN PATENT DOCUMENTS

| | | |
|---|---|---|
| 0 161 779 A1 | 11/1985 | (EP) . |
| 0 242 906 A1 | 10/1987 | (EP) . |
| 0 494 114 A2 | 7/1992 | (EP) . |
| 0 495 708 A1 | 7/1992 | (EP) . |
| 0 669 591 A2 | 8/1995 | (EP) . |
| 2 648 593 | 12/1990 | (FR) . |
| 2 677 135 | 12/1992 | (FR) . |

\* cited by examiner

Primary Examiner—William A. Cuchlinski, Jr.
Assistant Examiner—Yonel Beaulieu
(74) Attorney, Agent, or Firm—Fish & Richardson P.C.

(57) ABSTRACT

A method is provided for remotely identifying electronic or radio frequency tags, typically those used to mark articles, from a station, each of the tags having its own code constituted by digits, in which identification of a tag comprises the steps of issuing interrogation signals from the station for different digit positions and employing procedures to accelerate tag identification once a first tag has been found. A suitable station and tag are also provided.

32 Claims, 4 Drawing Sheets

METHOD FOR REMOTELY INTERROGATING TAGS, AND STATION AND TAG IMPLEMENTING SAID METHOD

BACKGROUND OF THE INVENTION

This invention relates to a method for automatic remote identification of electronic tags (also known as radio or RF tags) each one of which has its own code consisting of digits, from a station. It also relates to a station for remotely identifying electronic tags each having its own code consisting of digits together with an index representing the position or rank of a digit within said code, notably for implementing the method.

The invention also relates to an electronic tag having means for communicating with a station, for receiving interrogation or polling signals from the station and sending responses to the station along with control means and means for storing a code consisting of digits, notably for implementing the method. The invention also relates to a combination of the station and tags.

The invention generally relates to the field of interrogating electronic tags remotely from an inquiry station or exit gate or the like. Numerous applications are possible, in widely-ranging field. The following can be given as examples:

- checking, checking out and/or verifying electronically-tagged articles purchased by supermarkets customers;
- counting of tagged objects for stock management in a factory or industrial plant;
- recognizing and orienting tagged objects such as, for example, suitcases in an airport;
- recognizing the passage of objects fitted with tags, such as for example automobiles at a pay station, and exchange of information with such objects;
- in systems for restricting access or for monitoring access of persons carrying an electronic tag to an installation or site, etc.

Other applications are possible.

In the remainder of this specification, the term "tag" will simply be used to designate an electronic or radio tag, independently of its physical support or use.

The term "gate" or "station" will generally be used for the station from which tags are polled; the physical form of this station is obviously not limited to the physical structure of a frame or gate.

The terms interrogation and polling (a variety of which is sometimes called probing) as used herein refers to a process in which an inquiry station interrogates tags in order to exchange information with them, if necessary.

Systems for remotely polling tags carrying a code already exist.

French patent application 2,648,593 discloses a method and device used for inventory purposes consisting in sequentially polling tags carrying a code, and successively transmitting polling signals corresponding to the first, first two, first three, possible bits of the tag code. Here, only those tags for which the start of the code corresponds to the polling signal reply.

European Patent application EP-A-0,161,779 discloses an identification system in which transponders carrying their own code respond to a station interrogation signal. The data broadcast by each transponder is of a predetermined length and includes an error correcting code; the station can thus detect collision of responses, in other words simultaneous or overlapping responses from different transponders. If the station detects no error, it retransmits the code it receives; the transponder compares this signal with its own code; where they agree, the transponder sends an acknowledgement signal and goes into standby mode; otherwise, it goes on standby over a random number of cycles before starting to broadcast again.

European Patent application EP-A-0,242,906 discloses a system for identifying tags which can apparently only operate with one single tag, and in which it is suggested that the tag be reprogrammed during predetermined intervals of the signal broadcast by the station, after the tag is recognized.

European Patent application 0,494,114 discloses an electronic identification system in which the tags respond after a random time interval of the type of that described in European Patent application 0,161,779.

European Patent application 0,495,708 discloses a system for communication between a base station and mobile terminals, in which the mobile terminals respond to a polling signal within a time window which depends on the first digit of their code; the tag response signal is of the type in EP-A-0,161,779, providing collision management.

Additionally, U.S. Pat. No. 4,071,908 discloses a system for polling terminals over a line, in a completely different context from that of the invention, and further implementing a principle similar to that in FR-A-2,648,593. The polling context in this patent involves frequencies that are much higher than those usually employed for tags, and the problem of optimizing transmission duration does not arise. In this document, interrogation consists in sending a complete code. Moreover, the method proposed in this document has no sense unless the number of terminal stations in the system is known.

European patent application 0,669,591 discloses a remote information transmission system. Here, successive determinations are made to investigate if a transponder is in one half of the total number of tags, and, if this is the case, dividing the set of transponders into two, and continuing to do so until only one single transponder is left. Transponders reply to each interrogation by issuing their code, followed by an error correction code. This document only discloses the method known as a dichotomizing (binary) search, and does not propose determining if tags or transponders exist having one of a set of possible digits at a certain digit position in their code. Nor is there any suggestion of blocking the tags or transponders, and, consequently, this would not be useful, due to the presence of error correcting codes.

French patent application 2,677,135 discloses a method for remote interrogation of tags carrying a binary code. Here, it is proposed to interrogate the tags at each step using questions that depend on the proceeding step. The method in this patent does not operate for codes that are not binary, and cannot simply be envisaged for non-binary codes. In binary, this method involves full scanning of the complete code, starting from the first digit and proceeding to the last, which can be detrimental to the time needed for interrogation.

These systems suffer from disadvantages.

They are hardly suitable for solving the technical problem involved in simultaneously, and rapidly interrogating or polling a large number of tags. Indeed, they often require long messages both at station and tag level, which, notably in the case of low frequencies, lengthens the total polling time.

Collision avoidance or management between responses multiplies exchange of information, and lengthens polling time; the use of random periods of time increases total polling time where a large number of tags are involved. There is additionally the problem of generating random numbers, notably in the case of a large number of identical tags.

Finally, the above solutions do not allow fast interrogation of tags, with the ability to adapt to all possible tag code configurations.

SUMMARY OF THE INVENTION

The invention provides a solution to the problem of simultaneously and rapidly interrogating or polling a large number of tags. It enables a large number of tags to be polled within a total period that is shorter than that in known systems; it operates just as well for a reduced number of tags.

The invention also provides an original solution to the problem of interrogating a large number of articles carrying similar codes.

Finally, the problem sets out to resolve the new problem of reading or writing at a given level of a tag code.

This is achieved, in the invention which provides a method for remotely identifying electronic tags from a station, each of said tags having its own code constituted by digits, in which identification of a tag comprises the steps of:

(a) determining if tags exist having one of possible digits at a certain digit position or rank in their code;

(b) prior to a last digit position, determining if tags exists for a given digit, storing this digit and then temporarily blocking all other tags, and returning to step (a) for the next digit position;

(c) at a last digit position, determining if a tag exists for a given digit, storing this digit and reconstituting a tag code using said stored digits.

The step consisting in determining if tags exist having one possible digit at a digit position of their code can comprise polling said tags for the presence of a digit at said digit position of said code by sending from a station successive test interrogations to said tags.

This step can alternatively comprise polling said tags from a station, each of said tags issuing a response within a time window that is a function of a digit its code carries at this digit position.

In this case, step (b) is implemented as soon as a station has received at least one response, without waiting for other responses.

The step consisting in determining if tags exist having one of the possible digits at a digit position in their code can advantageously comprise:

determining if tags exist having, at a digit position in their code, a digit that is comprised in a set of digits;

if such tags do exist, then determining whether tags exist having one of the digits of said set at said digit position in their code; and if such tags do not exist, determining if tags exist having one of the digits of the complementary set of said set at this digit position of their code.

In this case, the set preferably contains half of the possible digits.

If the code comprises digits to a base 10, the set of digits comprises the digits $\{0,1,2,3,4\}$ or $\{5,6,7,8,9\}$.

The step consisting in determining if tags exist having one of the possible digits at a digit position in their code comprises:

at least two steps consisting in determining whether tags exist that have, at a digit position in their code, a digit that is comprised in a set of digits, the cardinal number of a set in one of said steps being lower than the cardinal number of the set in the preceding step;

a step consisting in determining if tags exist having one of the digits in a set corresponding to the last of said two steps.

Where the code comprises digits to the base 10, the method can comprise:

a step for determining if tags exist having, at a digit position in their code, a digit comprised in the set $\{1,2,3,4\}$;

if a result of this first step is positive, a step consisting in determining if tags exist having at a digit position in their code, one of the digits of the sets $\{0,1,2\}$, $\{3,4\}$;

if a result of said first step is negative, a step consisting in determining if tags exist having one of the digits of the sets $\{5,6\}$, $\{7,8,9\}$.

In one embodiment, the method can comprise, during or after step (c) a step (d) consisting in unblocking temporarily blocked tags, blocking a tag the code of which has been reconstituted, and returning to a first digit position, and then proceeding to step (a) for identifying a next tag.

Step (c) can additionally comprises blocking a tag the code of which has been reconstituted.

In this case, the method then comprises repeating steps (a) and (c) in order to identify other tags which only differ in their last digit.

The method can comprise the steps consisting of:

(e) returning to a previous digit position, and unblocking those tags which were temporarily blocked at said previous digit position;

(f) determining if tags exist having one of possible digits at this digit position in their code, and returning to step (b) if such tags exist, and otherwise, proceeding to step (e).

In this case, there are preferably a limited number of successive iterations covering steps (e) and (f) and wherein, when this limited number is reached, a step (g) is implemented consisting in unblocking tags that were temporarily blocked, and returning to a first digit position, and then proceeding to step (a) for identifying a next tag.

In one embodiment, when identifying a tag, said station does not again repeat polling operations for which is has received no reply from tags during preceding tag identification steps.

Advantageously, during identification of a tag, said station does not send interrogation signals corresponding to time windows in which it received no reply from tags during preceding tag interrogation steps.

It can be provided for the station to send successive test interrogations to said tags for the presence, at a given tag digit position, of a digit of a corresponding digit position in the code of a previously identified tag, as long as responses from tags are the same as those when a preceding tag was being identified.

The step of polling tags can include a step of writing into tag codes.

Polling of the tags can start at a digit position in said code which is not the first.

The invention also provides a station for remotely identifying electronic tags each having their own code constituted by digits and an index representing a digit position in said code, comprising means for sending polling signals to said tags, means for receiving responses from said tags, and control means, wherein said polling signals comprise:

a start-off-analysis instruction D;

an instruction A for advancing an index position in said tags;

at least one interrogation for determining whether a given digit at a digit position in said code corresponding to said index is present in said tags.

In one embodiment, the number of interrogations for determining the presence of a given digit at a digit position corresponding to an index of said code in said tags is equal to the number of digits in a base of the code used for said tags.

The polling signals can further comprise interrogations making it possible to determine if a digit at a tag code digit position corresponding to said index belongs to a set.

The means for receiving responses from tags can comprise means for defining differing reception time intervals in order to receive responses corresponding to different values of tag digits.

In one embodiment, the polling signals comprise an instruction for blocking tags.

Polling signals can also include an instruction for setting a tag index to zero and a test polling signal for detecting the presence of tags that are not blocked.

Polling signals can also include an instruction for decrementing by 1 a digit position index of said tags.

The control means advantageously comprise means for storing polling signals making it possible to determine the presence of a given digit at a digit position of a tag code corresponding to an index for which no response from said tags is received.

The invention also provides an electronic tag having means for communicating with a station for receiving polling signals from said station and for sending responses to said station, means for controlling and storing a code constituted by digits, said tag having at least one first blocked state, one second temporarily blocked state, and a third state in which it can send responses, said tag comprising an index representing a digit position within a code of said tag, and a memory for storing a digit position of said code.

The control means can, in one embodiment, comprise means for timing responses as a function of a digit read at an address defined by said index, whereby specific send time intervals correspond to various values of said digit.

The invention also provides an electronic tag having means for communicating with a station for receiving polling signals from said station and for sending responses to said station, means for controlling and storing a code constituted by digits, said tag having at least one first blocked state, one second temporarily blocked state, and a third state in which it can send responses, said tag comprising an index representing a digit position within a code of said tag, said control means comprising means for timing responses as a function of a digit read at an address defined by said index, whereby specific send time intervals correspond to various values of a digit.

The code storage means preferably include a storage region that is representative of the size of a portion of a protected code. This storage region is preferably only able to be modified once.

Finally, the invention provides a combination of such a station and at least one such tag.

Further advantages, characteristics and features of the invention will become more clear from the description that follows of various embodiments provided by way of example and with reference to the attached drawings.

DETAILED DESCRIPTION OF PREFERRED EMBODIMENTS

Figure 1:
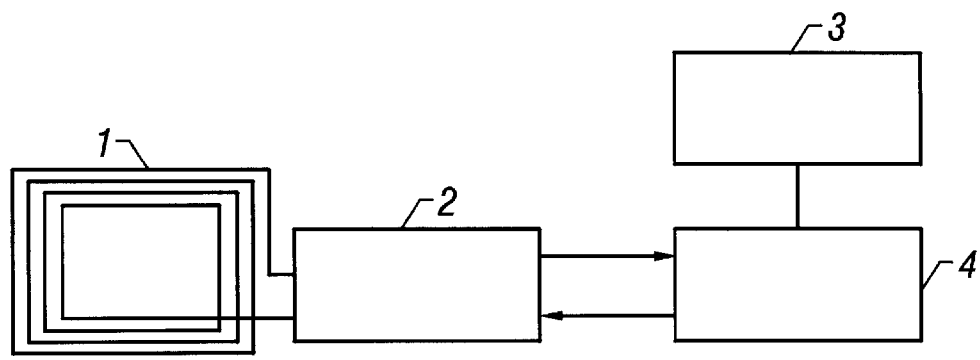
FIG. 1 is block diagram of an electronic tag.

FIG. 1 is a block diagram of an electronic tag, suitable for use in the present invention.

The tag in FIG. 1 includes an application specific integrated circuit, in other words a semiconductor chip, means for communicating with a station or gate, for example by radio or by induction, as well as power supply means; these power supply means can comprise a battery, a terminal for connection to a power source, or an induction device. It is notably possible to employ active tags, where the tag is designed to be used with a system that includes a source of power, such as for example a automobile or similar.

Advantageously, the communication and power supply means can comprise a single coil 1, which fulfils in this case three separate functions:

picking up, by induction, the power needed to operate the semi-conductor chip, thereby constituting a power supply unit;

receiving relevant instructions originating from the station or gate;

transmitting responses from the tag.

In the embodiment of FIG. 1, the chip also comprises:

analog circuits 2 which control the supply voltage originating from coil 1, format the instructions received, and modulate the current in coil 1 when a response is to be sent;

a memory 3 for the code, for example on 64 digits;

logic circuits 4 which determine the tag's response as a function of the questions furnished by the station and of the value of the code contained in memory 3.

Memory 3 can be a ROM chip and can also advantageously comprise an EEPROM or EPROM, or Flash memory, or any other memory means, or, where power is permanently present, a RAM memory; the code may, in certain cases, be modified if necessary during polling.

The tag in FIG. 1 possesses the functionalities necessary to implement the invention: ability to remotely communicate with the station in receive or send mode; preservation of an optionally reprogrammable code; drawing up of tag responses as a function of the questions received from the station.

For the implementation of this invention, one can advantageously use the tags disclosed in applicant's co-pending application entitled "Power and modulation circuit for a remotely-pollable tag".

The method of the invention can also be implemented, more generally speaking, with any type of tag that can be remotely polled or interrogated. Other tags are thus described in the prior art patents discussed above.

Figure 2:
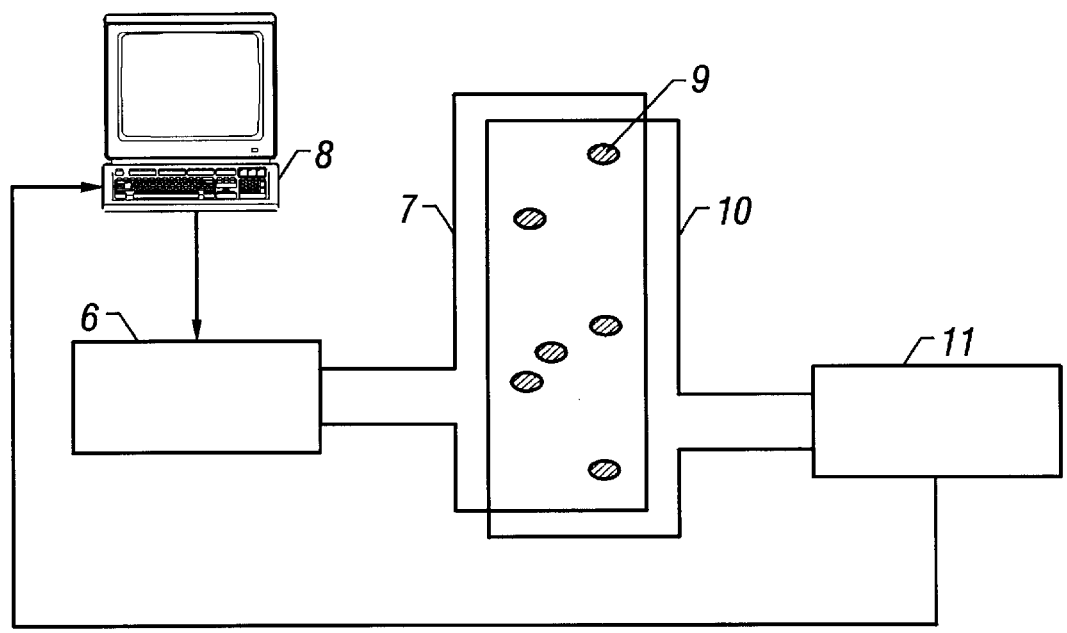
FIG. 2 is a block diagram of a polling station or gate.

FIG. 2 is a block diagram of a polling or interrogation station or gate, designed to be used for implementing the present invention, with tags of the type of those in FIG. 1.

The station of FIG. 2 comprises a send circuit 6 delivering a high frequency current into an inductor 7; if necessary, in the case of passive tags without any permanent power supply, this current has sufficient power to supply all the tags present in the station's three-dimensional reading space.

The station comprises control means 8, such as, for example, a conventional PC-type computer or equivalent.

These control means send current modulation instructions to send unit 6, for transmitting questions to the tags 9.

In parallel with the induction coil, the station comprises a read loop 10 for picking up responses from the tags 9. The response signals are amplified and formatted by a receiver 11 and return to the control means.

The station in FIG. 2 has those functionalities needed to implement the invention: possibility of remote communication with the tags, in receive mode using the read loop or in send mode using the inductor; drawing up of queries to the tags as a function of the responses received from them; processing of results, depending on the application.

The method of the invention can be implemented using other polling or interrogation stations, similar to those described in the cited prior art documents.

Advantageously, this invention can however implement the station described in applicants co-pending application entitled "Phase control method for electronic tags and station and tag implementing said method".

Whatever the case may be, the invention can be implemented with stations and tags that simply provide remote communication.

According to the invention, it is proposed to proceed with identifying each tag's specific code in the following manner, with the steps comprising:

(a) determining if tags exist having one of possible digits at a certain digit position or rank in their code;

(b) prior to a last digit position, determining if tags exists for a given digit, storing this digit and then temporarily blocking all other tags, and returning to step (a) for the next digit position;

(c) at a last digit position, determining if a tag exists for a given digit, storing this digit and reconstituting a tag code using said stored digits.

In binary tree terms (for a binary digit code) or m-ary tree (for a code of base m), this amounts to traversing the tree at the first level, then passing to the second level as soon as a tag is found, and so on. Upon arriving at the leaves of the tree, a tag has been found.

A first embodiment of the invention will now be described. Signals sent from the station to the tags will be called polling signals or interrogations and signals sent from the tags to the station will be called responses.

The following signals may be sent by the station.

The station may send a start-off-evaluation instruction, identified by "D" below.

The station may send test interrogations; it can send the same number of test interrogations as there are possible digits in the base used to code the tags.

Finally, the station can send a tag index advance instruction.

Each tag has its own code, composed of a certain number of digits, using a given base. Each tag has several states, and more precisely, at least three states. In a first or blocked state, the tag has already been recognized by the station and does not respond.

When it is not in a blocked state, the tag can be in a second state, or temporarily blocked state, in which it considers that it is no longer recognized by the station, and should await a start off evaluation instruction. The tag can also be in a third, or response, state, in which the tag considers itself recognized by the station and can respond to interrogations from the station.

In one embodiment of the tag, the blocked or unblocked state of the tag is indicated by a value 1 or 0 of a blocking variable; this variable can correspond to the state of a flip-flop in the tag's logic circuits.

In one embodiment, the state indicating whether the tag is or is not recognized at any given instant is represented by a value 1 or 0 or a variable reco; this variable can also correspond to the state of a flip-flop in the tag's logic circuits. In this case, the blocked, temporarily blocked or respond states correspond to the following values for the pair (blocking, reco): (1,0) or (1,1), (0,0) and (0,1).

Each tag comprises an index indicating a given digit position in its code, corresponding to the digit position currently under evaluation in the polling process. The name of this variable is index; the value of index in a tag varies between 0, which corresponds to evaluation of the first digit of the code, and n−1, which corresponds to evaluation of the last digit of the code, n being the number of digits in the code.

Each tag is additionally able to reply to interrogations from the station, by issuing a unique type of response, under conditions explained below. This signal is designed to be able to be detected by the station regardless of the number of tags responding.

The method of the invention can thus be implemented as follows.

At the start of a search or evaluation sequence, the station sends an interrogation D, which initialises all tag index and blocking variables, the reco variables being set to 1. Next, the station sends a succession of test interrogations corresponding to different possible values of the first digit of tag codes, then waiting for a response from the tags after each test. A given tag responds to a test interrogation by a tone or BIP signal if the digit of its code corresponding to the index, in other words, if the first digit has a value that corresponds to the test interrogation.

When the station receives a BIP signal, the station knows there is at least one tag the first digit of the code of which is that of the test just sent. This digit is stored and the station sends an advance signal or instruction A. When the tags receive the advance signal, their index switches from 0 to 1. Additionally, the reco flip-flop of tags, with the exception of those which responded to the previous test interrogation, switches from 1 to 0. In other words, all tags the first digit of the code of which is not the same as the first digit stored, switch over to their temporarily blocked state.

The search then continuous for the second digit: the station successively sends test interrogations, corresponding to different possible values of the second digit of the tag codes, and waits for a response from tags after each test. A given tag responds to a test interrogation with a BIP signal if a value of the second digit of its code corresponds to the test interrogation. When the station receives this BIP, it knows there is at least one tag the second digit of the code of which is that of the test interrogation just sent. This second digit is stored, and the station sends an advance signal A.

This process is repeated until all the digits in a tag code have been covered.

When the index is pointing to the last digit of the code, and no tag responds to a test, the station has stored all the digits of a tag, in other words has recognized the presence of a tag having a given code within the evaluation field. Next, the station sends an advanced signal and the tag whose code has just been recognized switches to a blocked state.

The effect of sending the advanced signal after interrogation at the last digit position also has the effect of switching all those tags which were in the temporarily blocked state back to the response state. Finally, the advance signal switches the index of the last digit of the code to the first (index=0).

It will be understood that at this moment we are in a situation similar to that existing just after the sending of signal 1): nevertheless, a tag has been recognized and is in a definitively blocked state.

The search procedure can be repeated until the last tag has been recognized. The station knows the search procedure is terminated when it has received no response to all the test interrogations sent out for the first code digit. At this instant, the interrogation procedure is interrupted and all tags present in the field have been recognized.

The sequence in appendix 1 is an example of a succession of interrogations and responses for a three-digit code on a base of 10, for three tags. The ten test interrogations are referenced (0) to (9).

It will thus be understood that the invention makes it possible, using messages of minimal length and a very small number of messages, to recognize, in a reduced period of time, a number of tags that can be as high as necessary. Thus, in the case of a code to base 10, 12 interrogations—a D instruction, ten tests (0) to (9), and an A instruction—are sufficient in a minimal configuration, meaning that the interrogations can be coded on only four bits.

The responses from the tags have the advantage of only needing one single bit.

Compared to known systems, the invention has the advantage of not needing to detect and manage response collisions, which simplifies transmission constraints, reduces response time and makes for simpler evaluation: there is no need to evaluate any CRC (cyclic redundant check) code or similar in the station. The station and the tags thus have very simple logic circuits, and are highly robust.

Compared to known systems using random periods between responses, and for which increasing the number of tags can lead to total polling time increasing exponentially, the invention has the advantage that the total duration of evaluation is always substantially proportional to a number of tags.

We shall now describe other embodiments which make it possible to further improve the total duration of interrogation.

In one embodiment of the invention, blocking instructions (B) and resetting instructions, (/) are added to the above signals (D), tests (0) to (9) plus A, these instructions having the following effects.

(B) switches a tag which is at response status to a blocked state; in other words (B) sets blocking to 1 if reco–1.

(Z) performs tag index reset, setting reco to 1; this causes those tags which were in a temporary blocked state to change to response status; additionally, tags that are not blocked responds with a BIP tone.

In this case, it can be seen that the instruction (Z) makes it possible in one single interrogation, to investigate if there are still tags that are not blocked. Compared to the first embodiment, this avoids the need to carry out ten interrogations (where the base of the code is ten) in order to be sure there are no tags that are not blocked.

Instruction (B) makes for simpler tag logic, and is sent at the end of a tag interrogation when a tag has been recognized. Actually, the presence of (B) simplifies the response from the tag to the instruction (A), the only effect of which now is to advance index.

Instruction (B) also makes it possible to employ codes the number of useful digits of which is chosen by the user as a function of the envisaged application, in the example, a maximum of 64; if (B) is absent the length is set once and for all in the hardware of the tag's logic, and can no longer be modified.

Finally, the presence of instructions (B) and (Z) makes it possible to interrupt a search sequence, to return to the beginning where there has been a problem with, for example, transmission, or where interference has been detected by the station.

It is also possible to provide, if appropriate, and as indicated above, for (D) to unblock tags, in other words set blocking to 0. This has the advantage of allowing tags to be interrogated several time over, if necessary. Inversely, it could be useful in some applications for tags that have already been interrogated to no longer be polled in this particular read phase.

In another embodiment of the invention, the number of interrogations is limited, it being ensured that when a tag is identified, the station does not again send interrogations for which it has received no response from tags, when identifying previous tags.

By way of example, the table in appendix 2 gives an example of a succession of interrogations and responses, in this embodiment, for the same situation as the sequence in appendix 1, employing instructions (B) and (Z).

In the sequence of appendix 2, when identifying the first tag, it is necessary to test at each level (index=0, then index=1, then index=2), all digits possible starting from 0.

For the following tags, certain interrogations for which the station has received no response can be eliminated.

Thus, after identifying and blocking the tag with code 123, it is known that the following configurations are empty:

| | |
|---|---|
| 0 x x | no reply to interrogation No. 3 |
| 1 0 x | no reply to interrogation No. 6 |
| 1 1 x | no reply to interrogation No. 7 |
| 1 2 0 | no reply to interrogation No. 10 |
| 1 2 1 | no reply to interrogation No. 11 |
| 1 2 2 | no reply to interrogation No. 12. |

Then, to test the remaining tags, one will start with a test (1), in other words for codes 1xx (No. 17), and not with test (0), as it is known there are no tags with code 0xx.

As this test is positive (a tag with code 125), one can proceed directly to test (2) for the codes 1 2 x (No. 19), skipping tests (0) and (1) as it is known that there are no tags with a code 1 0 x end 1 1 x.

As this test is also positive, one can directly skip to test (3), for the code 1 2 3 (No. 21), skipping test (0), (1) and (2), as it is known that no tags have the code 1 2 0, 1 2 1 and 1 2 2.

In other words, in the sequence in appendix 2, this embodiment makes it possible to skip the interrogations 14, 17, 18, 21, 22, 23 and 28 in the sequence of appendix 1, the interrogation (Z) replacing the final interrogations 40 to 49.

It will be noted that in this example, the use of the instruction (B) and (Z), and the fact of the station not needing to again issue interrogations for which no response has been received from tags during proceeding tag identification steps, makes it possible to reduce the number of interrogations by 16.

Considering a tree structure, this avoids traversing branches of the tree which are known to be empty, as there was no response at the time of a previous interrogation.

Figure 3:
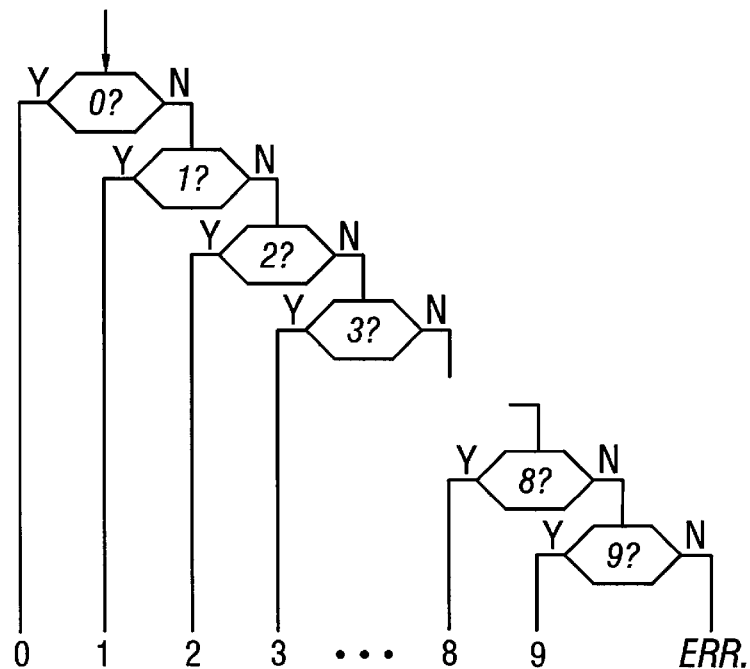
FIG. 3 is a flow chart for the tests at a given digit position or rank in the code, according to one embodiment of the invention.

FIG. 3 is a flowchart showing the test for a given rank or digit position, in one embodiment of the invention. FIG. 3 corresponds to the embodiment described above, in which, in order to determine if tags are present having one of the possible digits at a given digit position on their code, the station sends successive test interrogations to the tags, looking for the presence of a digit in the specified position in the code. More precisely, in the example of FIG. 3, the code digits are to a base 10 and the stations successively send interrogations (0), (1), . . . (9) to determine of the digit in a tag code, and an index signal giving the digit position in said code, is a "0", a "1" . . . or a "9".

This gives the following results:

| Digit: | 0 | 1 | 2 | 3 | 4 | 5 | 6 | 7 | 8 | 9 | Total |
|---|---|---|---|---|---|---|---|---|---|---|---|
| No. of interrogs.: | 1 | 2 | 3 | 4 | 5 | 6 | 7 | 8 | 9 | 10 | 55 |

The description that follows with reference to FIGS. 4 to 9 shows how the number of interrogations can be reduced even further.

Figure 4:
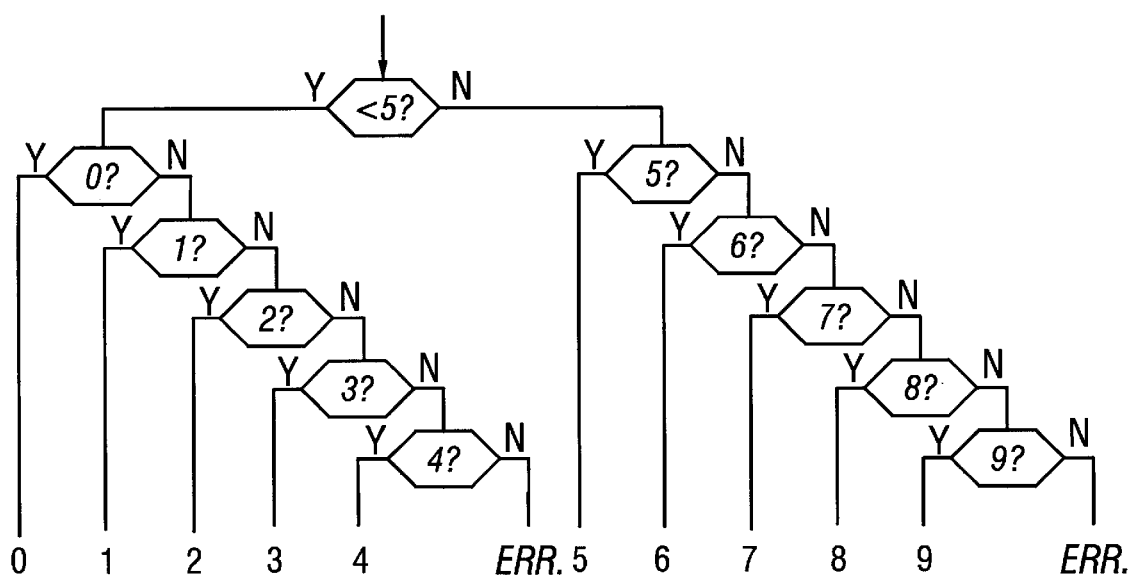
FIG. 4 is a flow chart for the tests at a given digit position, according to another embodiment of the invention.

FIG. 4 is a flow chart of the tests for a given digit position, according to a further embodiment of the invention. In this embodiment, for a given digit position, to determine if tags are present having one of the possible digits at this position in their code, the procedure comprises:

- a step in which it is determined if tags are present having one of the digits comprised in a set of digits, at this digit position in their code;

determining if tags exist having one of the possible digits at a digit position in their code comprises:

- determining if tags exist having, at a digit position in their code, a digit that is comprised in a set of digits;
- if such tags do exist, then determining whether tags exist having one of the digits of said set at said digit position in their code; and
- if such tags do not exist, determining if tags exist having one of the digits of the complementary set of said set at this digit position of their code.

In other words, to accelerate recognition, a first test is carried out, the tags being separated into two groups, after which the tests are only done on one group. This is obviously only a value where the base is relatively high.

As an example, considering a base 10, one can proceed with a "median, mi-point or mean value" test which consists in comparing the digit read with the value 5. If the digit is less than 5, the tag responds with a BIP, and the station's processor will then test the values from 0 to 4. Otherwise, the test will be done on the digits 5 to 9.

The result will then be as follows:

| Digit: | 0 | 1 | 2 | 3 | 4 | 5 | 6 | 7 | 8 | 9 | Total |
|---|---|---|---|---|---|---|---|---|---|---|---|
| No. of interrogs.: | 2 | 3 | 4 | 5 | 6 | 2 | 3 | 4 | 5 | 6 | 40 |

To implement this procedure, the following interrogation instructions are needed:

- (M) Advance to next digit position and then test if digit<5
- (0)(1)(2)(3)(4)(5)(6)(7)(8)(9) Ten test interrogations for value of digit.

Interrogation (M) can replace instruction (A) above. Where the base is 10, all the interrogations can still be coded on four bits.

The set of digits does not need to be constituted by consecutive numbers; it is obviously useful when the set and its complement have the same cardinal number, if tag codes are distributed uniformly.

Figure 5:
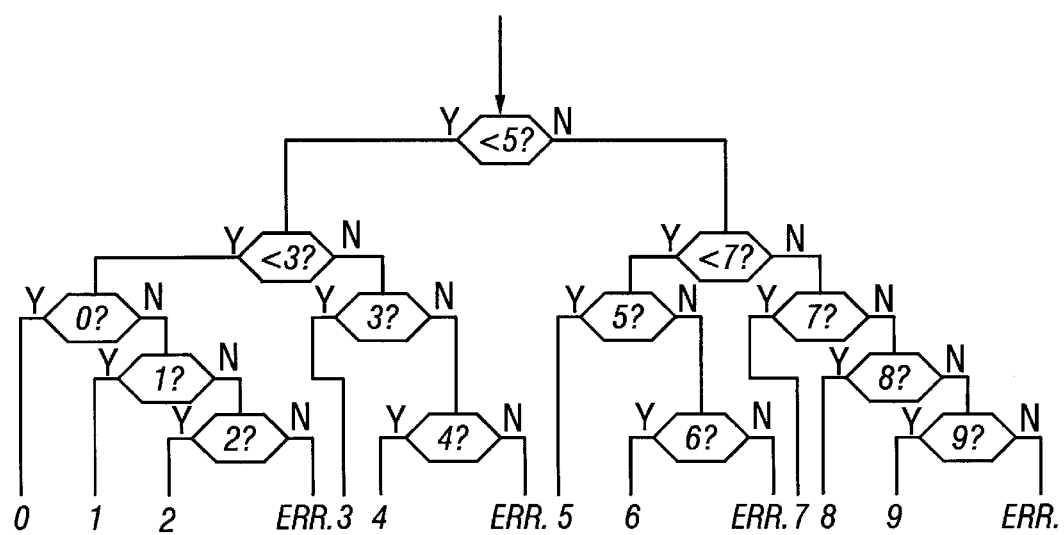
FIG. 5 is a flow chart for the tests at a given digit position, according to yet another embodiment of the invention.

FIG. 5 is a flow chart of tests for a given digit position according to a further embodiment of the invention; in this embodiment, for a given digit position, in order to determine if tags are present having one of the possible digits at this position in their code, the procedure comprises:

- at least two steps consisting in determining whether tags exist that have, at a digit position in their code, a digit that is comprised in a set of digits, the cardinal number of a set in one of said steps being lower than the cardinal number of the set in the preceding step;
- a step consisting in determining if tags exist having one of the digits in a set corresponding to the last of said two steps.

In other words, a dichotomizing method is used to separate the tags and tests are only done on a reduced number of tags. Considering a base 10, a two-step dichotomizing method can be used, determining, in a first step if tags exist for which the digit at the current digit position is comprised in the set {0, 1, 2, 3, 4} and if the response is positive, determining, in a second step, whether there are tags for which the digit is comprised in the set {0, 1, 2}.

If the response of the second step is positive, one proceeds to determine if tags are present having one of the digits of the set {0, 1, 2} in other words performing the tests (1), (1) and (2). If the response of the second step is negative, it is determined whether there are tags having one of the digits of the set {3,4} in other words tests (3) and (4) are carried out. If the response is negative at the second step, the presence of tags having a digit comprised in the set {5, 6} is tested for. If this yields a positive response, a test is done for the presence of one of the digits of the set {5, 6} in other words the test (5) and (6) are done. If the response at this second step is negative, it is determined whether there are tags having one of the digits in the set {7, 8, 9}, in other words the tests (7), (8) and (9) are carried out.

Obviously, to carry out the test (0), (1) and (2); or (3) and (4); or (5) and (6); or (7), (8) and (9), the same procedure as was explained with reference to FIG. 3, or in FIG. 7, is followed.

Compared to the embodiment of FIG. 4, two additional comparisons are necessary, one with value 3 and the other with value 7, as indicated below. This method, although more complex, is statistically faster than that in FIGS. 3 and 4, and leads to the following results:

| Digit: | 0 | 1 | 2 | 3 | 4 | 5 | 6 | 7 | 8 | 9 | Total |
|---|---|---|---|---|---|---|---|---|---|---|---|
| No. of interrogs.: | 3 | 4 | 5 | 3 | 4 | 3 | 4 | 3 | 4 | 5 | 38 |

The following instructions are used in implementing this embodiment:

- (M) Advance to next digit position and then test if digit<5
- (T) Test if digit<3 (mnemonic code "T" for "Three")
- (S) Test if digit<7 (mnemonic code "S" for "Seven")
- (0)(1)(2)(3)(4)(5)(6)(7)(8)(9) Ten test instructions for value of digit.

For a base 10, other sets can be chosen. Notably where the base is higher, the dichotomizing (binary) interrogation can be pursued further, using more than two steps.

Figure 6:
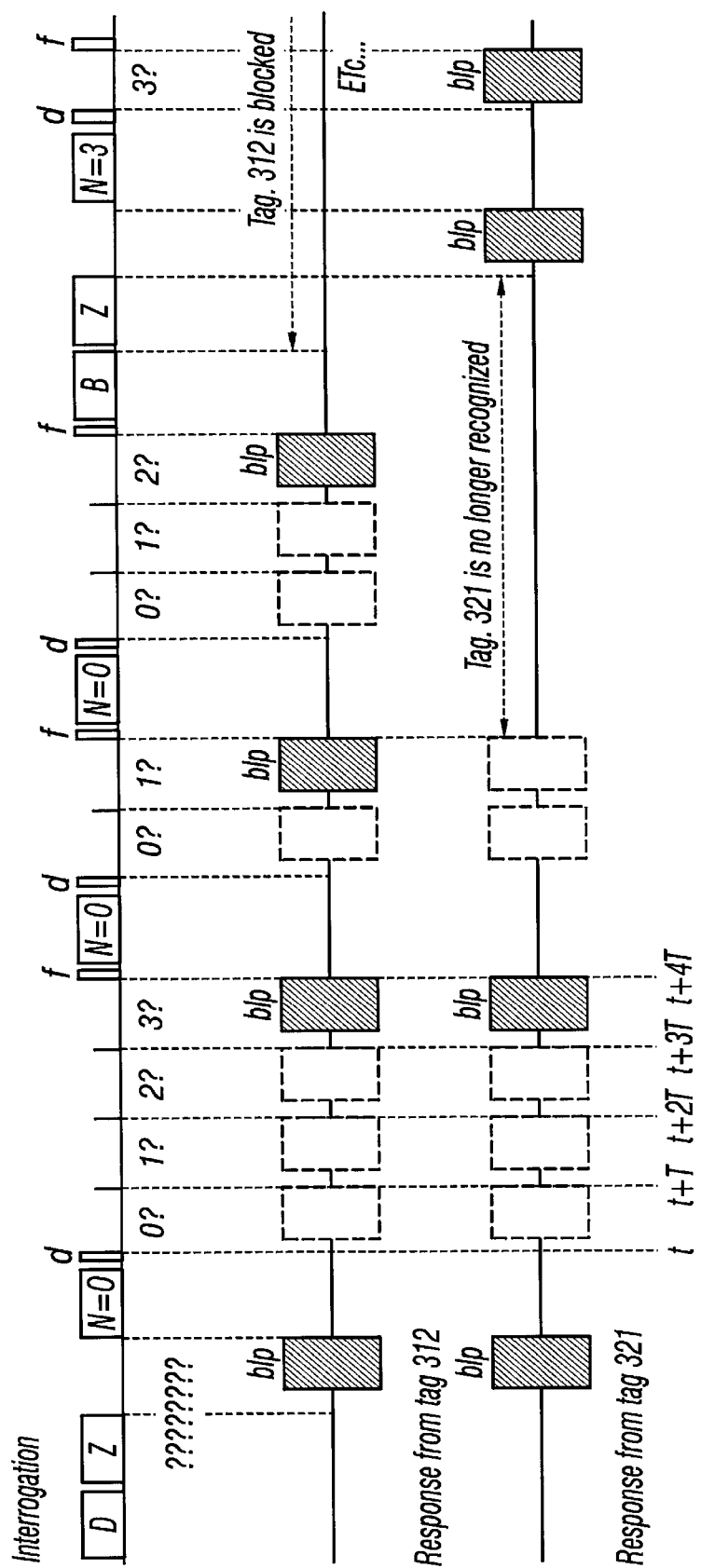
FIG. 6 is a timing diagram for an identification sequence in one embodiment of the invention.

FIG. 6 is a flow chart of an identification sequence in another embodiment. In this embodiment, for determining if tags exist having one of the possible digits at a given digit position in their code, the station interrogates the tags and each tag sends a response within a time window, this time window depending on the digit it has at the specific position in the code.

Thus, instead of successively posing the questions: (N)? (N+1)? (N+2)? (N+3)? . . . , this amounts, considering a base of 10, to putting the first question (N) ? and awaiting for a positive response within a time window the position in time of which will depend on the value of the code of the tag currently being identified.

If we consider that at time t=0, a brief signal (d "start") is sent following the instruction (N), the response from a tag will be as follows:

from t=0 to t=T if code=N from t=T to t=2.T if code=N+1 from t=2.T to t=3.T if code=N+2 from t=3.T to t=4.T if code=N+3 etc.

T being the normal transmission duration of a response "BIP".

Advantageously, where tags are remotely powered, periods of the remote powering voltage are counted in order to define accurately successive intervals T.

In one embodiment, one proceeds to the next digit position as soon as the station has received at least one response, without waiting for any further responses. Immediately one of the tags within the inductive field responds, the station's processor converts the time of the response into a value from 0 to 9, and sends a signal (f "end") informing all the tags that a digit has been recognized, and that now identification will proceed on the next digit position, by incrementing their addresses (index+1).

Tags that have not sent a response are no longer recognized (their variable reco is set to zero).

Like in the preceding embodiments:

a tag can only issue a BIP signal if it is not blocked and if it has responded positively for all the digits of the beginning of the code.

a tag which has been fully recognized receives a blocking instruction (B).

FIG. 6 illustrates the interrogation on three digits of a code to the base 10 for two tags the codes of which are 312 and 321.

Identification of the first tag is done with tests that start with the instruction "n=0".

As explained above, one can provide for the station not to again issue interrogations for which no response has been received from tags during preceding tag identifications. Thus, after identifying the tag with code 312, direct use can be made of the instruction "N=3" for testing the first digit of remaining tags as it is known that there is no code starting with 0, 1 or 2. Effectively, no response was received in the time windows 0, 1 and 2 for the interrogation "N–0" during identification of tag 312.

Using this "implicit series test", there is an average gain, for each digit in the code, of 5 times the transmission time for one explicit test instruction such as (0) to (9) or (A). It is thus possible to multiply the speed of identification by a factor of around 2 compared to the embodiment shown in the sequence of appendix 2.

The table in appendix 3 is an example of a sequence of interrogations and responses in another embodiment of the invention. In this embodiment, the following steps are used to determine if tags are present having one of the possible digits at a certain digit position:

determining if tags exist having, at a digit position in their code, a digit that is comprised in a set of digits;

if such tags do exist, then determining whether tags exist having one of the digits of said set at said digit position in their code; and if such tags do not exist, determining if tags exist having one of the digits of the complementary set of said set at this digit position of their code.

For the later two steps, the same type of tests are used as were used with reference to FIG. 6. In other words, the embodiment of appendix 3 is to the embodiment of FIG. 6 what the embodiment of FIG. 4 is to the embodiment of FIG. 3.

By way of example, considering base 10, a systematic mid-point test is done to determine if there are tags present with a digit comprised in the set {0, 1, 2, 3, 4} at the digit position currently being investigated, using an interrogation (M). Depending on the response to test M "code<5?", it will be followed by the instruction "N=0" (if the test is positive) or by "N=5" (if the test is negative).

In the sequence of appendix 3, the time intervals of the implicit test of the type in FIG. 6 are symbolised by "_____" numbered starting from 0. For example, the instruction "5_____" corresponds to response on a code=7. In appendix 3, three tags are to be found coded 123, 652 ad 891.

Appendix 4 shows a sequence of interrogations and responses for another embodiment of the invention. In this embodiment, the principle of a dichotomizing (binary) search method is used, as explained with reference to FIG. 5, along with the implicit response principle, as explained with reference to FIG. 6.

Here, test M "code<5?" followed by the test T "code<3?" or, depending on the response received S "code<7?" are employed.

Depending on the case, these will be followed by one of the four implicit test instructions "N=0", "N=3", "N=5" or "N=7". The same notation is used in appendix 4 as was used in appendix 3. The usefulness of this embodiment depends on the base, the method becoming increasingly useful as the value of the base increases.

We shall now describe a further embodiment of the invention, which may or may not be combined with the embodiments described above.

In this embodiment, a tag that is recognized is blocked immediately. Following this, the next step consist in determining if there are tags present with one of the possible digits at the last digit position in its code. This makes it possible to identify other tags for which the only difference is in the last digit of their code, without having to again recognize the initial digits, which are identical. If we consider a tree search, this avoids having to start out at the root at each interrogation.

As an example, always considering a base 10, if tags are present with codes 12341, 12342, 12343 and 12811, after having identified and blocked a tag with code 12341, again search if tags are present having a code 1234x, in order to find tag 12342. This latter tag is blocked, and again the presence of tags with code 1234x is investigated, leading to the tag coded 12343 being found. This avoids having to twice repeat the recognition steps for the four first digits 1234 of the code. After blocking tag 12343, it is determined that there are no more tags coded 1234x present, with one of the possible digits at their final digit position. Following this, the search returns again to the initial digit position 0, for identification of tag 12811.

Advantageously, the steps consisting of:

returning to a previous digit position, and unblocking those tags which were temporarily blocked at said previous digit position, and determining if tags exist having one of possible digits at this digit position in their code; and continuing if such tags exist, and otherwise returning to a previous bit position can be employed, and, if this is the case, advancing and, otherwise, again going back one to the preceding digit position.

For example, for tags coded 54812, 54831 and 54111, after identifying tag 54812, the latter tag is blocked, and index is decremented until a digit position is found for which one or several tags have been temporarily blocked. These tags are now unblocked (reco–1) and the identification procedure starts from this digit position.

Thus, to continue the example, for index=3, a tag coded 54831 is found during a search to identify tags coded 548xx. This tag will be definitively blocked after identification. Next, index is decremented to index–2 where tag 54111 is encountered, which will be identified in its turn by starting testing for 54xxx.

This embodiment is particularly advantageous where the code comprises two parts:

a prefix which is identical for all articles which are identical (for example the thirteen digits used in conventional bar codes)

a suffix which is incremented as each article is manufactured making it impossible for articles to have identical codes (requiring a minimum of 3 digits). When so-called chip tags are used at the end of an article's production line, the codes employed will only differ in their final digits.

In one advantageous embodiment, the number of "go-back" operations, i.e. the number of successive iterations of all the above steps, is limited and, when this limited number is reached, tags which were temporarily blocked are now unblocked, and the search returns to the initial digit position. This saves time when there is a changeover to evaluating a code with a new prefix. For example, if no response was found after going back six times to a preceding digit position, it is probable that the remaining tags have different prefixes, or, alternatively, that no more tags remain to be read. It is sufficient to recommence a conventional procedure starting from the first digit in the code.

An example of this embodiment will now be described. A memory is provided in the chip logic designed to hold the address adr_non_reco, this being the address starting from which a tag has no longer been recognized during a current identification procedure. This address memory is reset at the beginning of each read operation, specified by instruction (Z).

Let it be supposed for example that three tags with the following codes are in the process of being read:

| Address: | 0 1 2 3 4 5 |
|---|---|
| Tag No. 1: | 5 3 4 0 1 5 |
| Tag No. 2: | 5 3 4 0 1 7 |
| Tag No. 3: | 5 3 4 6 2 4 |

Tag 534015, whose code is lowest, will be the first to be recognized, and then blocked by instruction (B). Now, tag 534017 will have a value adr_non_reco=5 in memory, this giving the digit position of the first non-recognized digit. For tag 534624, adr_non_reco=3 as only the first three digits are identical to those of tag 543015.

After blocking recognized tag 543015, a go-back instruction (R) is issued. The address is decremented in all tags that are not blocked, going from 6 to 5. Every tag for which adr_non—_reco is greater or equal to the new value of the current address should reply with a BIP tone, in this case it is tag 534017 that will reply. It is consequently known that a tag coded 54301x exists.

Forward searching can now be restarted, for finding one or more digits at the end of the code without having to begin again with the initial digits of the code, with considerable saving in time, particularly in the case of long codes.

When tag 534017 has been recognized and blocked, the last tag (534624) will have a value adr_non_reco=3 in memory, and 3 go-back instructions (R) will require to be sent for it to respond and be identified in its turn.

Limiting the number of go back steps is of great value, and in the example above is limited to 3. If this maximum number is reached a new conventional procedure, starting from the first digit, is initiated by issuing instruction (Z).

The go-back instruction can be employed with the various methods described above (series test of FIG. 3, mid-point test of FIG. 4, dichotomizing test of FIG. 5 or implicit test of FIG. 6 and appendices 3 and 4).

Appendix 5 illustrates, using this principle, the full procedure for reading three tags, and using an implicit series test. The time intervals of the implicit series test are again shown symbolically by "___", numbered starting from 0. For example, the instruction "5___" corresponds to a response on a code −7. At the end of an implicit test, the digit position (index) is advanced by one, indicated by "(then advance index)" in appendix 5.

In another embodiment of the invention, tag interrogation starts at a digit position other than the first digit position in the code. Thus, the initial digits of the code can be ignored which may be useful in some applications. If a given digit position has a particular significance or meaning in a given application, reading can start directly from this digit position, without necessarily starting from the first digit position. This is particularly easy in the examples given above as it suffices to issue a corresponding number of instructions (A). Once again considering this from the point of view of a tree search, this corresponds to avoiding having to search between the root of the tree and a given point.

In another embodiment, tag interrogation includes a step consisting in writing to a tag code. This can typically be used for marking tags which have undergone a specific treatment, and the like. In this case, it is also particularly useful to be able to start reading tag codes at a specific digit position.

A preferred embodiment will be described using instructions or interrogations issued from a station which can supplement those used in the examples in appendix 1 or appendix 2. Preferably, and in order to allow prior selection, partial read or write operations on the code are only authorized for tags which have just been identified (reco=1), and which are not yet blocked (blocking=0). Nevertheless, such identification can be partial: for example, if it is known that only one tag is present in the area covered by a station's inductive field, it suffices to issue instructions (D) and (Z) to set this tag to the required status. It is also possible to simultaneously write to all tags the code of which starts with a given prefix, the prior recognition procedure being limited to the length of such prefix.

One can also check whether a whole batch of tags has the same content in a particular code field. For example, a digit 1 can be written at code address 50 when an article bearing a tag has by paid for, this digit being zero before payment. The read procedure that will now be described enables it to be immediately known if all articles present in the area covered by a station's inductive field have been effectively paid for.

Before starting a read or write operation, it is necessary to define the length (number of digits) and start address of the field concerned. This can be done by means of:

an instruction (N) followed by q digits, the latter declaring the number of digits to be read or written: considering a 64-digit memory, q will equal 2 digits, and the instruction will cover N01 to N64;

an instruction (X) followed by r digits for declaring the address of the first digit to be read or written; in the case of a 64-digit memory, r will equal 2 digits, and the instruction will cover X00 to X63.

The numbers q and r obviously depend on memory size, or on the envisaged application; they may also depend on the base used to store digits.

In the case of partial reading of one or several tags, one can use next an instruction (L) for partially reading the code of a recognized tag, after the instructions (N) and (X). Instruction (L) is followed by a brief signal, which acts as a time reference. A tag which is read then sends a series of bits representing successive digits, for example using a BIP tone for a "1" and a silence of the same duration to represent a "0". However, this is only one possible transmission mode. Using the remote-powering frequency as a clock signal makes it possible to avoid any uncertainty regarding the identity of a transmitted bit. In order to detect non-identical multiple responses (a tag representing an unpaid article in a batch of tags or, similarly, two tags which both reply simultaneously whereas only one was normally concerned) digit values are advantageously transmitted using an error detecting code such a the Manchester code or the "2 out of 5" code. The Manchester code consists in transmitting a bit at "0" by a silence followed by a BIP tone and a bit at "1" by a BIP tone followed by a silence. If two tags have different responses, there will be at least one bit at "0" transmitted at the same time as a bit at "1", resulting in two successive BIP tones; this being readily detectable.

The "2 out of 5" code represents the 10 digits 0 to 9 by 5 bit words in which only 2 bits are at "1", the 3 other being at "0", as indicated in the table below. All simultaneous non-identical responses result in a code with more than 2 bits at "1" and the fact of receiving more than 2 bit tones while a digit is being transmitted is considered as an anomaly.

| Conversion of a decimal digit into "2 out of 5" code | | | | | | |
| --- | --- | --- | --- | --- | --- | --- |
| Digit | bit 4 | bit 3 | bit 2 | bit 1 | bit 0 | Code |
| 0 |   |   |   | x | x | 3 |
| 1 |   |   | x |   | x | 5 |
| 2 |   |   | x | x |   | 6 |
| 3 |   | x |   |   | x | 9 |
| 4 |   | x |   | x |   | 10 |
| 5 |   | x | x |   |   | 12 |
| 6 | x |   |   |   | x | 17 |
| 7 | x |   |   | x |   | 18 |
| 8 | x |   | x |   |   | 20 |
| 9 | x | x |   |   |   | 24 |

In the table above, the last column gives the value, to base 10, corresponding to the 5-bit code employed.

The invention thus allows partial tag reading with effective management of tag sending conflicts. Again, a simple and robust solution is provided.

The ability to provide partial code writing is also useful. For this, an instruction (B) can be used enabling all or part of the code of a recognized tag, even of several tags, to be written to. This instruction follows the instructions (N) and (X) mentioned above. It is followed by the values of the digits to be modified.

For example, still to base 10, and for tags with 64 digit memories:

N05X10E31416 will lead to the 5 digits "31416" to be written from address 10 to address 14.

Other instructions can be used. If it is for example desired to only write or read a single digit, the instruction (X) will suffice; otherwise, instruction (A) could be repeated in order to avoid supplementary instructions. It can also be arranged for instruction (N) to be followed by the first digit to be read or written, and the instruction (X) by the first digit to be read or written; also the instruction could be followed by the q+r digits representing, respectively, the number of digits to be read or written and the address of the first digit.

In one embodiment of the invention the means for storing of the code have a storage region that is representative of the size of a portion of protected code. In this case, this portion of the tag code cannot be written to. For example, in a tag with a 64-digit memory, the 2 last digits of this memory can contain information representing the portion of code which is protected. In this case, it is advantageous for this storage regions to only be able to modified once. For example, when the tag is manufactured, this region has null value, and modifications of this region are only admissible when its value is still null. This region can then be modified for protecting a portion of the code, this being done by entering the size of that portion of the code that is to be protected, any further modification of this region being impossible as its value will no longer be null.

As an example of this, we shall describe the base for a 64-word memory. Protection is applied to the first (np) digits of the code. This number np is, for example, stored on the first ??? to words of the memory (at addresses 62 and 63). Originally, these two words have null value, and protection is non existent. Code protection will then consist in writing this code, and then loading the number of digits to be protected into addresses 62 and 63. Any code modification at an address below np will then forbidden, as will any modification of the last two words of the memory.

In other words, writing to an EEPROM memory will be forbidden:

if (index<np), thereby ensuring the first digits are protected or if [(index>61) and (np>0)], ensuring protection of np for a non-null value, thereby preventing any modification after first protection.

The number of digits in the storage region can vary as a function of the nature for the memory or code, and the position of the storage region can obviously also vary.

Thus, simple and robust protection which is easy to implement is provided. This also avoids the need for passwords and other usual systems.

We shall now describe, by way of comparison, various tag recognition sequences provided by way of example. We shall notably consider a procedure such as the one described in French patent application 2,677,135 (FR-A-2,677,135).

As explained above, in numerous applications, ROM memory tags can be employed, the content of which is determined once and for all by laser beam impact on each chip of a wafer. This operation is advantageously done at chip foundry level. In this case, it is desirable to have access to a database to obtain all useful characteristics of an article on which a tag will be used. The advantages of such tags, compared to EEPROM tags result from reduced cost and improvement in sensitivity, notably as a result of reduced power consumption.

Two zones can be provided to the code thus memorized.

an identifier for the application, this corresponding to a specific application, and for example covering 5 digits in octal coding, allowing up to 32768 applications specified. This identifier is an easy way of eliminating "foreign" tags, for example, considering the case where the application is a laundry, for preventing an "access control" tag that has been left in the pocket of an article of clothing from being identified;

an article identifier, which is automatically incremented as tags are manufactured. Ten octal coded digits can for example by provided, giving a capacity of $8^{10}$, in other words, over 1 billion.

In a batch of articles to be identified, it is quite credible that tags will be found with the same sequence for their first 11 or 12 digits, for example:

32764 000256 1304

32764 000256 2130

32764 000256 6027

According to the invention, such a batch of articles is identified advantageously as follows. Implicit series tests of the type described above with reference to FIG. 6 are used; for simplifying the notation, rather than indicating implicit tests time intervals by "___" as was done in appendix 3, we shall use a brackets notation. Thus, 5(3) corresponds to the instruction "5___", in other words a response on a code=7. Use will thus be made in an octal code of the instructions 0? to 7?, symbolised by implicit series test in the form 0(t) to 7(t), where t is the number of elementary time intervals before a response is received. As above, D is the initialisation and instruction (Z) is the tag presence test instruction and B is the instruction for blocking an identified tag.

In this case, the first tag of octal code 32764 000256 1304 is identified by the following sequence:

D, Z(1), 0(4), 0(3), 0(8), 0(7), 0(5),
0(1), 0(1), 0(1), 0(3), 0(6), 0(7),
0(2), 0(4), 0(1), 0(5), B.

Identifying 15 octal coded digits of the first tag thus requires an average of 18 instructions and a mean duration of 15x(Nmoy+1)+1 elementary time intervals Mmoy being the mean value of the code digit. With Mmoy=3.5 around 68 elementary timing intervals are encountered.

In a first embodiment of the invention, interrogations for which the enquiry station has received no reply are avoided when identifying subsequent tags as explained above with reference to appendix 2. In other words, when identifying a tag, the station does not issue corresponding interrogations during time windows for which no reply was received from tags during preceding tag interrogations steps. This means that, for tags that follow, at least at the beginning, the first path through the tree that was followed for the first tag is followed. This is for example done using successive test interrogations in order to find, for a given digit position, tags with a digit at the digit position corresponding to that of a previously-identified tag, as long as the responses of the same as those during identification of the proceeding tag. This is reflected in an implicit test, by responses over the first time interval for as long as the responses are the same. As soon as the responses are no longer the same, normal interrogation takes over, with questions of the type 0?.

Interrogations corresponding to the code of the previously-identified tag can also be used, even without using implicit tests. As soon as the responses are different, in other words, as soon as there is no response to interrogation, normal tests are used again, thus either interrogations from (0) to (7) in octal code, or mid-point tests or dichotomizing tests.

In other words, returning now to our example, identification of the second tag (32764 000256 2130) is achieved as follows:

Z(1), 3(1), 2(1), 7(1), 6(1), 4(1),
0(1), 0(1), 0(1), 2(1), 5(1), 6(1),
1(2), 0(2), 0(4), 0(1), B.

Starting from the response to interrogation 1? at the beginning of the third line, the tree-structure used for the first tag is no longer followed after direct recognition of the common start 32764 000256 of the codes.

Identification of the second and following tag requires an average of 17 instructions, and an average of 11+4x(Nmoy+1)+1 elementary time intervals as there are 11 common octal digits. An average of 30 time intervals is encountered.

In order to identify (n) tags having the same common route, there are thus needed:

(n×17)+1 instructions, and
8+(n−1)×30=38+(n×30) intervals

Supposing that an interrogation and a time interval are both of identical duration T, a total duration of ((n×47)+39)×T is found In a second embodiment, a go-back instruction (R) is used as explained above.

In this case, the second tag is identified in the following way:

Z(1), R(1), R(1), R(1), R(1),
0(3), 0(2), 0(4), 0(1), B.

Actually, after identifying the first tag, it is necessary to advance or go back four digits to find the common route (32764 000256) of the tags. Starting from the second tag, an average of:

10 instructions,
4×(Nmoy+1)+5 intervals, equivalent to 23 intervals with Nmoy=3.5 are needed.

In order to identify (n) tags with a common root.

(n×10)+18 instructions, and
68+(n×23) intervals are needed.

Considering that an interrogation and a time interval are of an equal duration of T, a total duration of:

((n×33)+86)×1 is encountered.

Now, compared with the procedure disclosed in FR-A-2,677,135 which only operates in binary, FR-A-2,677,135 requires one instruction for each bit identified and one time interval to wait for a response, in other words 2×T for each bit. For n tags and a binary code length corresponding to 15 octal-coded digits, i.e. for a 45-bit code length, the total time necessary is:

(1+(45×2))×n×T=n×91×T

As soon as there are more than two tags with a common root—which is highly probable, as explained above—, the method of the present invention is preferable. In the table below, this invention and the known methods are compared for differing number of tag (2, 5, 10, 30 or 100 tags indicated at the head of each column:

|  | 2 | 5 | 10 | 30 | 100 |
|---|---|---|---|---|---|
| 1st mode | 133 | 274 | 509 | 1449 | 4739 |
| 2nd mode | 152 | 251 | 416 | 1076 | 3386 |
| FR-A-2,677,135 | 182 | 455 | 910 | 2730 | 9100 |
| ratio | 1.2 | 1.8 | 2.0 | 2.5 | 2.7 |

The invention thus provides an at least 120% improvement as soon as there are more than ten tags to be recognised.

Obviously other embodiments of the invention are possible. The code can use numbers written to another base, for example base 2, in which case the word "digit" above will be replaced by "bit". Choice of a suitable base makes it possible to optimise the number of interrogations, and to make use of all possible combinations for a given number of bits in the interrogation messages.

Interrogation can also be done on groups of code digits; for example to the base 2, interrogation could be based on groups of three binary digits of the code (8 combinations), and in this case interrogation would cover digit (bits) positions 1 to 3, then 4 to 6, and so on. This amounts to interrogating to a base of 8.

Communication between the inquiry station and the tags can be of a type different to that described: thus communication can be optical by ultrasound, or otherwise, depending on the particular application and the type of interference present.

The various embodiment of the invention—go-back instructions avoiding repeating interrogations that gave no response during proceeding tag identifications, implicit series testing, dichotomizing (binary) testing, mid-point testing—can be freely combined or used independently.

Appendix 1.

Example for three tags with 3-digit code: 123, 125, 321

| No. | I | Code tested | Resp | Commentary |
|---|---|---|---|---|
| 1 | D | | | Begin evaluation |
| | | | | index = 0 |
| 2 | 0 | 0 x x | | Code[0] = 0 ? |
| 3 | 1 | 1 x x | | Code[0] = 1 ? |
| | | | BIP | Responses from tags 123 and 125 |
| 4 | A | | | Advance --> index = 1 (recognition of tag 321 = 0) |
| 5 | 0 | 1 0 x | | Code[1] = 0 ? |
| 6 | 1 | 1 1 x | | Code[1] = 1 ? |
| 7 | 2 | 1 2 x | | Code[1] = 2 ? |
| | | | BIP | Responses from tags 123 and 125 |
| 8 | A | | | Advance --> index = 2 |
| 9 | 0 | 1 2 0 | | Code[2] = 0 ? |
| 10 | 1 | 1 2 1 | | Code[2] = 1 ? |
| 11 | 2 | 1 2 2 | | Code[2] = 2 ? |
| 12 | 3 | 1 2 3 | | Code[2] = 3 ? |
| | | | BIP | Response from tag 123 |
| 13 | A | | | Advance --> index = 0 |
| | | | | recognition of tags 125 and 321 = 1 |
| | | | | BLOCKING OF TAG 123 |
| 14 | 0 | 0 x x | | Code[0] = 0? |
| 15 | 1 | 1 x x | | Code[0] = 1 ? |
| | | | BIP | Response from tag 125 |
| 16 | A | | | Advance --> index = 1 (recognition of tag 321 = 0) |
| 17 | 0 | 1 0 x | | Code[1] = 0 ? |
| 18 | 1 | 1 1 x | | Code[1] = 1 ? |
| 19 | 2 | 1 2 x | | Code[1] = 2 ? |
| | | | BIP | Response from tag 125 |
| 20 | A | | | Advance --> index = 2 |
| 21 | 0 | 1 2 0 | | Code[2] = 0 ? |

30

| | | | | |
|---|---|---|---|---|
| 22 | 1 | 1 2 1 | | Code[2] = 1 ? |
| 23 | 2 | 1 2 2 | | Code[2] = 2 ? |
| 24 | 3 | 1 2 3 | | Code[2] = 3 ? (no BIP tone, tag 123 is blocked) |
| 25 | 4 | 1 2 4 | | Code[2] = 4 ? |
| 26 | 5 | 1 2 5 | | Code[2] = 5 ? |
| | | | BIP | Response from tag 125 |
| 27 | A | | | Advance --> index = 0 |
| | | | | recognition of tag 321 = 1 |
| | | | | BLOCKING OF TAG 125 |
| 28 | 0 | 0 x x | | Code[0] = 0 ? |
| 29 | 1 | 1 x x | | Code[0] = 1 ? (no BIP tone, tags 123 and 125 blocked) |
| 30 | 2 | 2 x x | | Code[0] = 2 ? |
| 31 | 3 | 3 x x | | Code[0] = 3 ? |
| | | | BIP | Response from tag 321 |
| 32 | A | | | Advance --> index = 1 |
| 33 | 0 | 3 0 x | | Code[1] = 0 ? |
| 34 | 1 | 3 1 x | | Code[1] = 1 ? |
| 35 | 2 | 3 2 x | | Code[1] = 2 ? |
| | | | BIP | Response from tag 321 |
| 36 | A | | | Advance --> index = 2 |
| 37 | 0 | 3 2 0 | | Code[2] = 0 ? |
| 38 | 1 | 3 2 1 | | Code[2] = 1 ? |
| | | | BIP | Response from tag 321 |
| 39 | A | | | Advance --> index = 0 |
| | | | | BLOCKING OF TAG 321 |
| 40 | 0 | 0 x x | | Code[0] = 0 ? |
| 41 | 1 | 1 x x | | Code[0] = 1 ? |
| 42 | 2 | 2 x x | | Code[0] = 2 ? |
| 43 | 3 | 3 x x | | Code[0] = 3 ? |
| 44 | 4 | 4 x x | | Code[0] = 4 ? |
| 45 | 5 | 5 x x | | Code[0] = 5 ? |
| 46 | 6 | 6 x x | | Code[0] = 6 ? |
| 47 | 7 | 7 x x | | Code[0] = 7 ? |
| 48 | 8 | 8 x x | | Code[0] = 8 ? |
| 49 | 9 | 9 x x | | Code[0] = 9 ? |
| | | | | No response : end of interrogation |

31

Appendix 2

Example with 3 tags and 3-digit code: 123, 125, 321

| No. | I | Code tested | Resp. | Commentary |
|---|---|---|---|---|
| 1 | D | | | Begin evaluation |
| | | | | blocking = 0 |
| 2 | Z | | | Test for presence of non blocked tags |
| | | | | index = 0   reco = 1 |
| | | | BIP | Responses from tags 123, 125 and 321 |
| 3 | 0 | 0 x x | | Code[0] = 0 ? |
| 4 | 1 | 1 x x | | Code[0] = 1 ? |
| | | | BIP | Responses from tags 123 and 125 |
| 5 | A | | | Advance --> index = 1 (reco variable for tag 321 = 0) |
| 6 | 0 | 1 0 x | | Code[1] = 0 ? |
| 7 | 1 | 1 1 x | | Code[1] = 1 ? |
| 8 | 2 | 1 2 x | | Code[1] = 2 ? |
| | | | BIP | Responses from tags 123 and 125 |
| 9 | A | | | Advance --> index = 2 |
| 10 | 0 | 1 2 0 | | Code[2] = 0 ? |
| 11 | 1 | 1 2 1 | | Code[2] = 1 ? |
| 12 | 2 | 1 2 2 | | Code[2] = 2 ? |
| 13 | 3 | 1 2 3 | | Code[2] = 3 ? |
| | | | BIP | Response from tag 123 |
| 14 | A | | | Advance --> index = 3 (reco variable for tag 125 = 0) |
| 15 | B | | | BLOCKING OF TAG 123 |
| 16 | Z | | | Test for presence of non blocked tags |
| | | | | index = 0   reco = 1 |
| | | | BIP | Responses from tags 125 and 321 |
| 17 | 1 | 1 x x | | Code[0] = 1 ? |
| | | | BIP | Response from tag 125 |
| 18 | A | | | Advance --> index = 1 (reco variable for tag 321 = 0) |
| 19 | 2 | 1 2 x | | Code[1] = 2 ? |
| | | | BIP | Response from tag 125 |
| 20 | A | | | Advance --> index = 2 |
| 21 | 3 | 1 2 3 | | Code[2] = 3 ? (no BIP tone, tag 123 is blocked) |
| 22 | 4 | 1 2 4 | | Code[2] = 4 ? |

32

| | | | | |
|---|---|---|---|---|
| 23 | 5 | 1 2 5 | | Code[2] = 5 ? |
| | | | BIP | Response from tag 125 |
| 24 | A | | | Advance --> index = 3 |
| 25 | B | | | BLOCKING OF TAG 125 |
| 26 | Z | | | Test for presence of non-blocked tags |
| | | | | index = 0   reco = 1 |
| | | | BIP | Response from tag 321 |
| 27 | 1 | 1 x x | | Code[0] = 1 ? (no BIP tone, tags 123 and 125 blocked) |
| 28 | 2 | 2 x x | | Code[0] = 2 ? |
| 29 | 3 | 3 x x | | Code[0] = 3 ? |
| | | | BIP | Response from tag 321 |
| 30 | A | | | Advance --> index = 1 |
| 31 | 0 | 3 0 x | | Code[1] = 0 ? |
| 32 | 1 | 3 1 x | | Code[1] = 1 ? |
| 33 | 2 | 3 2 x | | Code[1] = 2 ? |
| | | | BIP | Response from tag 321 |
| 34 | A | | | Advance --> index = 2 |
| 35 | 0 | 3 2 0 | | Code[2] = 0 ? |
| 36 | 1 | 3 2 1 | | Code[2] = 1 ? |
| | | | BIP | Response from tag 321 |
| 37 | A | | | Advance --> index = 3 |
| 38 | B | | | BLOCKING OF TAG 321 |
| 39 | Z | | | Test for presence of non-blocked tags. |
| | | | | No response : End of identification |

33

Appendix 3

Example for three 3-digit tags: 123, 652, 891

| Instructions | Response from tags | Digit identified | Commentary |
|---|---|---|---|
| D Z | 123, 652, 891 | | Start inquiries, Unblock tags |
| | | | Test existing tags |
| M | 123 | | Index = 0 |
| 0 _ _ | 1̲23 | 1 | Index = 0, Response over interval 1, then advance index |
| M | 123 | | Index = 1 |
| 0 _ _ _ | 12̲3 | 2 | Index = 1, Response over interval 2, then advance index |
| M | 123 | | Index = 2 |
| 0 _ _ _ _ | 123̲ | 3 | Index = 2, Response over interval 3 |
| B | | | Tag 123 recognized |
| Z | 652, 891 | | Test for presence of non-blocked tags |
| | | | index = 0 reco = 1 |
| M | | | Index = 0 |
| 5 _ _ | 6̲52 | 6 | Index = 0, Response over interval 6, then advance index |
| M | | | Index = 1 |
| 5 _ | 65̲2 | 5 | Index = 1, Response over interval 5, then advance index |
| M | 652 | | Index = 2 |
| 0 _ _ _ | 652̲ | 2 | Index = 2, Response over interval 2 |
| B | | | Tag 652 recognized |
| Z | 891 | | Test for presence of non-blocked tags |
| | | | index = 0 reco = 1 |
| M | | | Index = 0 |
| 5 _ _ _ _ | 8̲91 | 8 | Index = 0, Response over interval 8, then advance index |
| M | | | Index = 1 |
| 5 _ _ _ _ _ | 89̲1 | 9 | Index = 1, Response over interval 9, then advance index |
| M | 891 | | Index = 2 |

34

| | | | |
|---|---|---|---|
| 0 _ _ | 891 | 1 | Index = 2, Response over interval 2 |
| D | | | Tag 891 recognized |
| Z | | | Test for presence of non-blocked tags |
| | | | index = 0  reco = 1 |
| | | | No response. END |

Appendix 4

Example for three 3-digit tags: 123, 652, 891

| Instructions | Response from tags | Digit identified | Commentary |
|---|---|---|---|
| D Z | 123, 652, 891 | | Start inquiry, unblock tags |
| | | | Test for existing tags |
| M | 123 | | Index = 0 |
| T | 123 | | Index = 0 |
| 0 _ _ | 123 | 1 | Index = 0, Response over interval 1, then advance index |
| M | 123 | | Index = 1 |
| T | 123 | | Index = 1 |
| 0 _ _ _ | 123 | 2 | Index = 1, Response over interval 2, then advance index |
| M | 123 | | Index = 2 |
| T | | | Index = 2 |
| 3 _ | 123 | 3 | Index = 2, Response over interval 3 |
| B | | | Tag 123 recognized |
| Z | 652, 891 | | Test for presence of non-blocked tags |
| | | | index = 0 reco = 1 |
| M | | | Index = 0 |
| S | 652 | | Index = 0 |
| 5 _ _ | 652 | 6 | Index = 0, Response over interval 6, then advance index |
| M | | | Index = 1 |
| S | 652 | | Index = 1 |
| 5 _ | 652 | 5 | Index = 1, Response over interval 5, then advance index |
| M | 652 | | Index = 2 |
| T | 652 | | Index = 2 |
| 0 _ _ _ | 652 | 2 | Index = 2, Response over interval 2 |
| B | | | Tag 652 recognized |
| Z | 891 | | Test for presence of non-blocked tags |
| | | | index = 0 reco = 1 |
| M | | | Index = 0 |
| S | | | Index = 0 |

| | | | |
|---|---|---|---|
| 7 _ _ | 891 | 8 | Index = 0, Response over interval 8, then advance index |
| M | | | Index = 1 |
| S | | | Index = 1 |
| 7 _ _ _ | 891 | 9 | Index = 1, Response over interval 9, then advance index |
| M | 891 | | Index = 2 |
| T | 891 | | Index = 2 |
| 0 _ _ | 891 | 1 | Index = 2, Response over interval 2 |
| B | | | Tag 891 recognized |
| Z | | | Test for presence of non-blocked tags |
| | | | index = 0  reco = 1 |
| | | | No response, END |

Appendix 5
Example for 3 tags and 5-digit code: 534015, 534017, 534624

| Instructions | Response from tags | Digit identified | Commentary |
|---|---|---|---|
| D Z | 534015, 534017 534624 | | Start inquiry, unblock tags Test existing tags |
| 0 _ _ _ _ _ _ | 534015, 534017 534624 | 5 | Index = 0, Response over interval 5 (then advance index) |
| 0 _ _ _ _ | 534015, 534017 534624 | 3 | Index = 1, Response over interval 3 |
| 0 _ _ _ _ _ | 534015, 534017 534624 | 4 | Index = 2, Response over interval 4 |
| 0 _ | 534015, 534017 | 0 | Index = 3, Response over interval 0 adr_non_reco variable for tag 534624 = 3 |
| 0 _ _ | 534015, 534017 | 1 | Index = 4, Response over interval 1 |
| 0 _ _ _ _ _ _ | 534015 | 5 | Index = 5, Response over interval 5 Tag 534015 recognized adr_non_reco variable for tag 534017 = 5 |
| B | | | Blocking of tag 534015 (index = 6) |
| R | 534017 | | Go back to index 5, Response from tag 534017 (index <= adr_non_reco) |
| 5 _ _ _ | 534017 | 7 | Index = 5, Response over interval 2 Tag 534017 recognized |
| B | | | Blocking of tag 534017 (index = 6) |
| R | | | Go back to index 5 |
| R | | | Go back to index 4 |
| R | 534624 | | Go back to index 3, Response from tag 534624 (index <= adr_non_reco) |
| 0 _ _ _ _ _ _ _ | 534624 | 6 | Index = 3, Response over interval 6 |
| 0 _ _ _ | 534624 | 2 | Index = 4, Response over interval 2 |
| 0 _ _ _ _ _ | 534624 | 4 | Index = 5, Response over interval 4 Tag 534624 recognized |
| B | | | Blocking of tag 534624 |

38

| | | |
|---|---|---|
| R R R | none | Go back three times without response (go back max) |
| z | none | All tags are blocked, END |

What is claimed is:

1. A method for remotely identifying electronic tags from a station, each of said tags having its own code constituted by digits, in which identification of a tag comprises the steps of:

(a) determining if tags exist having one of possible digits at a certain digit position or rank in their code;

(b) prior to a last digit position, determining if tags exist for a given digit, storing this digit and then temporarily blocking all other tags, and returning to step (a) for the next digit position;

(c) at a last digit position, determining if a tag exists for a given digit, storing this digit and reconstituting a tag code using said stored digits.

2. The method according to claim 1, wherein the step consisting in determining if tags exist having one possible digit at a digit position of their code comprises polling said tags for the presence of a digit at said digit position of said code by sending from a station successive test interrogations to said tags.

3. The method according to claim 1, wherein the step consisting in determining if tags exist having one possible digit at a digit position of their code comprises polling said tags from a station, each of said tags issuing a response within a time window that is a function of a digit its code carries at this digit position.

4. The method according to claim 3, wherein step (b) is implemented as soon as a station has received at least one response, without waiting for other responses.

5. The method according to claim 1, wherein the step consisting in determining if tags exist having one of the possible digits at a digit position in their code comprises:

determining if tags exist having, at a digit position in their code, a digit that is comprised in a set of digits;

if such tags do exist, then determining whether tags exist having one of the digits of said set at said digit position in their code; and if such tags do not exist, determining if tags exist having one of the digits of the complementary set of said set at this digit position of their code.

6. The method according to claim 5, wherein said set contains half of the possible digits.

7. The method according to claim 5, wherein said code comprises digits to a base 10, and in which said set of digits comprises the digits {0, 1, 2, 3, 4} or {5, 6, 7, 8, 9}.

8. The method according to claim 1 wherein the step consisting in determining if tags exist having one of the possible digits at a digit position in their code comprises:

at least two steps consisting in determining whether tags exist that have, at a digit position in their code, a digit that is comprised in a set of digits, the cardinal number of a set in one of said steps being lower than the cardinal number of the set in the preceding step;

a step consisting in determining if tags exist having one of the digits in a set corresponding to the last of said two steps.

9. The method according to claim 8, wherein said code comprises digits to a base 10, the method comprising:

a step for determining if tags exist having, at a digit position in their code, a digit comprised in the set {1, 2, 3, 4};

if a result of this first step is positive, a step consisting in determining if tags exist having, at a digit position in their code, one of the digits of the sets {0, 1, 2}, {3, 4};

if a result of said first step is negative, a step consisting in determining if tags exist having one of the digits of the sets {5,6}, {7, 8, 9}.

10. The method according to claim 1, comprising, during or after step (c) a step (d) consisting in unblocking temporarily blocked tags, blocking a tag the code of which has been reconstituted, and returning to a first digit position, and then proceeding to step (a) for identifying a next tag.

11. The method according to claim 1, wherein step (c) additionally comprises blocking a tag the code of which has been reconstituted.

12. The method according to claim 11, wherein said method then comprises repeating steps (a) and (c) in order to identify other tags which only differ in their last digit.

13. The method according to claim 11, comprising the steps consisting of:

(e) returning to a previous digit position, and unblocking those tags which were temporarily blocked at said previous digit position;

(f) determining if tags exist having one of possible digits at this digit position in their code; and returning to step (b) if such tags exist, and otherwise, proceeding to step (c).

14. The method according to claim 13, wherein there are a limited number of successive iterations covering steps (e) and (f) and wherein, when this limited number is reached, a step (g) is implemented consisting in unblocking tags that were temporarily blocked, and returning to a first digit position, and then proceeding to step (a) for identifying a next tag.

15. The method according to claim 2, wherein, when identifying a tag, said station does not again repeat polling operations for which is has received no reply from tags during preceding tag identification steps.

16. The method according to claim 3, wherein during identification of a tag, said station does not send interrogation signals corresponding to time windows in which it received no reply from tags during preceding tag interrogation steps.

17. Method according to claim 2, wherein during identification of a tag, said station sends successive test interrogations to said tags for the presence, at a given tag digit position, of a digit of a corresponding digit position in the code of a previously identified tag, as long as responses from tags are the same as those when a preceding tag was being identified.

18. The method according to claim 1, further comprises a step of polling tags step of polling tags includes a step of writing into tag codes.

19. The method according to one of claims 1 to 18, wherein polling of said tags starts at a digit position in said code which is not the first.

20. A station for remotely identifying electronic tags each having their own code constituted by digits and an index representing a digit position in said code, comprising means for sending polling signals to said tags, means for receiving responses from said tags, and control means, wherein said polling signals comprise:

a start-off-analysis instruction D;

an instruction A for advancing an index position in said tags;

at least one interrogation for determining whether a given digit at a digit position in said code corresponding to said index is present in said tags.

21. The station according to claim 20, wherein said interrogations comprise a number of interrogations for determining the presence of a given digit at a digit position corresponding to an index of said code in said tags equal to the number of digits in a base of the code used for said tags.

22. The station according to claim 20, wherein said interrogations further comprise interrogations making it possible to determine if a digit at a tag code digit position corresponding to said index belongs to a set.

23. The station according to claim 20, wherein said means for receiving responses from tags comprise means for defining differing reception time intervals in order to receive responses corresponding to different values of tag digits.

24. The station according to claim 20, wherein said polling signals comprise an instruction for blocking tags.

25. The station according to claim 20, wherein said polling signals include an instruction for setting a tag index to zero and a test polling signal for detecting the presence of tags that are not blocked.

26. The station according claim 20, wherein said polling signals include an instruction for decrementing by 1 a digit position index of said tags.

27. The station according to claim 20, wherein said control means comprise means for storing polling signals making it possible to determine the presence of a given digit at a digit position of a tag code corresponding to an index for which no response from said tags is received.

28. An electronic tag having means for communicating with a station for receiving polling signals from said station and for sending responses to said station, means for controlling and storing a code constituted by digits, said tag having at least one first blocked state, one second temporarily blocked state, and a third state in which it can send responses, said tag comprising an index representing a digit position within a code of said tag, and a memory for storing a digit position of said code.

29. The electronic tag according to claim 28, wherein said control means comprise means for timing responses as a function of a digit read at an address defined by said index, such that specific send time intervals correspond to various values of said digit.

30. An electronic tag having means for communicating with a station for receiving polling signals from said station and for sending responses to said station, means for controlling and storing a code constituted by digits, said tag having at least one first blocked state, one second temporarily blocked state, and a third state in which it can send responses, said tag comprising an index representing a digit position within a code of said tag, said control means comprising means for timing responses as a function of a digit read at an address defined by said index, such that specific send time intervals correspond to various values of a digit.

31. The electronic tag according to claim 28, wherein said code storage means include a storage region that is representative of the size of a portion of a protected code.

32. The electronic tag according to claim 31, wherein said storage region can only be modified once.

\* \* \* \* \*